(12) United States Patent
Droppo et al.

(10) Patent No.: US 6,628,011 B2
(45) Date of Patent: Sep. 30, 2003

(54) DC TO DC CONVERTER AND POWER MANAGEMENT SYSTEM

(75) Inventors: Gerald W. Droppo, Richland, WA (US); Lawrence A. Schienbein, Kennewick, WA (US); Brent Earle Harris, Calgary (CA); Donald J. Hammerstrom, W. Richland, WA (US)

(73) Assignee: International Power System, Inc., Calgary (CA)

( * ) Notice: Subject to any disclaimer, the term of this patent is extended or adjusted under 35 U.S.C. 154(b) by 0 days.

(21) Appl. No.: 09/917,256

(22) Filed: Jul. 27, 2001

(65) Prior Publication Data

US 2002/0047309 A1 Apr. 25, 2002

Related U.S. Application Data

(60) Provisional application No. 60/221,596, filed on Jul. 28, 2000.

(51) Int. Cl.[7] ................................................. H02J 1/10
(52) U.S. Cl. .......................... 307/43; 307/64; 307/66; 307/43; 307/45
(58) Field of Search .......................... 307/64, 66, 43, 307/45

(56) References Cited

U.S. PATENT DOCUMENTS 6,096,449 A * 8/2000 Fuglevand et al. ............ 429/13
6,184,593 B1 * 2/2001 Jungreis ........................ 307/64
6,188,199 B1 * 2/2001 Beutler et al. ............... 320/125
6,243,277 B1 * 6/2001 Sun et al. .................... 323/222
6,255,008 B1 * 7/2001 Iwase ........................ 180/65.3

OTHER PUBLICATIONS

Claudio Manoel da Cunha Duarte and Ivo Barbi, "A New Family of ZVS–PWM Active–Clamping DC-to-DC Boost Converters: Analysis, Design, and Experimentation," IEEE Transactions On Power Electronics, vol. 12, No. 5, Sep. 1997, pp. 824–831.

* cited by examiner

*Primary Examiner*—Brian Sircus
*Assistant Examiner*—Sharon A. Polk

(57) ABSTRACT

A DC to DC Converter includes an electrical circuit that allows batteries and other electrical energy storage devices to be charged from or to discharge to a variable voltage DC bus. This electrical circuit also enables seamless integration with other energy storage devices and/or DC power sources, such as fuel cells, to provide DC power for a Power Management System. A Power Management System preferably provides both full power source management and power conditioning. The Power Management System is able to manage power flow to and from multiple, isolated power sources and energy storage devices to deliver high quality alternating current ("AC") power to a load.

13 Claims, 5 Drawing Sheets

Series Power Manager Configuration

Typical "Battery Node" Hybrid Power Configuration

Series Power Manager Configuration

Parallel Power Manager Configuration

Circuit A - Buck and Boost DC to DC Converter

Circuit B - Boost DC to DC Converter with Capacitor $C_{R2}$

Circuit C - Boost DC to DC Converter with Capacitor $C_1$

Duarte and Barbi - Boost DC to DC Converter

Current Through Inductor $L_{BB}$ Versus Time for One Cycle of Operation of Circuit A

DC TO DC CONVERTER AND POWER MANAGEMENT SYSTEM

This application claims priority from U.S. Provisional Patent Application Serial No. 60/221,596, filed Jul. 28, 2000.

BACKGROUND OF THE INVENTION

This invention relates generally to systems and methods for managing direct current ("DC") power. More specifically, this invention relates to DC to DC converters and power management systems and methods.

Today, most hybrid fuel cell/battery power systems, and other systems having multiple DC power sources and batteries, are arranged as shown in FIG. 1. The arrangement shown in FIG. 1 is referred to as the "battery node" approach because the power must pass through the battery output node at the battery voltage. This configuration therefore uses battery charge controller and inverter ratings that match the capacity of the fuel cell.

Conventional DC to DC converters and their associated inverter designs and products have several deficiencies that make it difficult for them to adequately meet the functional requirements of modern hybrid power systems. These conventional converters are therefore unable to satisfy the needs of a typical energy user. Among other problems, conventional DC to DC converters typically generate electrical noise and high frequency ripple currents on the input (source) and output (load) busses. They are also poorly adapted to the regulation of input current. Furthermore, they typically exhibit energy conversion efficiencies of only around 80–90%.

SUMMARY OF THE INVENTION

According to one aspect of this invention, a DC to DC Buck and Boost Converter is provided. "Buck" power conversion refers to a reduction in voltage from an input side of the converter to an output side. "Boost" power conversion refers to an increase in voltage from the input side to the output side of the converter. According to one embodiment of this invention, the Buck and Boost DC to DC Converter includes an electrical circuit that allows batteries and other electrical energy storage devices to be charged from or to discharge to a variable voltage DC bus. This electrical circuit can also be configured to enable seamless integration with other energy storage devices and/or DC power sources, such as fuel cells, to provide DC power for a Power Management System.

Improved Boost DC to DC Converters are also provided which reduce noise and ripple currents in low voltage/high current applications. According to one embodiment, a resonant capacitance is provided by two resonant capacitors which store voltage using switches that permit zero voltage switching. According to another embodiment, an input capacitor is provided to maintain a constant voltage input to a resonant circuit. The addition of the input capacitor reduces voltage stress in a switching circuit.

A DC to DC Converter is provided in a module of a Power Management System. The Power Management System preferably provides both full power source management and power conditioning. In other words, the Power Management System preferably manages power flow to and from multiple, isolated DC power sources and energy storage devices, while delivering high quality alternating current ("AC") power to a load.

BRIEF DESCRIPTION OF THE DRAWINGS

The foregoing features and advantages of the present invention will become more readily apparent from the following detailed description, made with reference to the following figures, in which.

DETAILED DESCRIPTION

Figure 2:
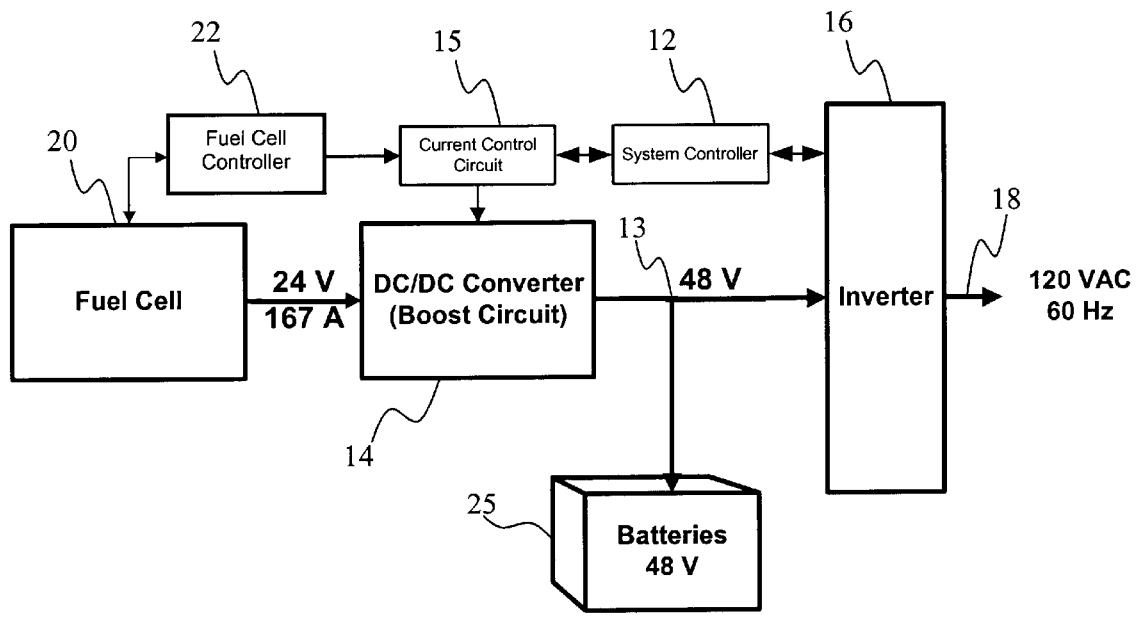
FIG. 2 is a schematic block diagram of a series power management system configuration according to one embodiment of the present invention.
Figure 3:
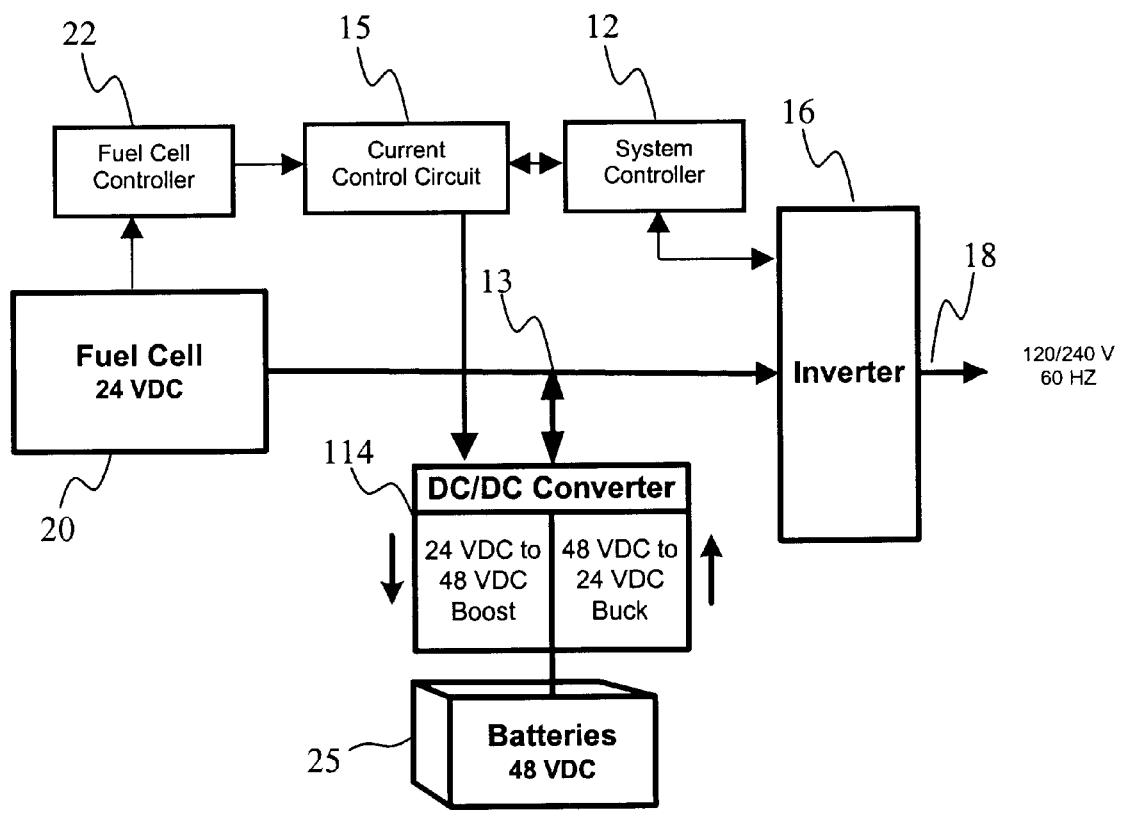
FIG. 3 is a schematic block diagram of a parallel power management system according to another embodiment of the present invention.

There are presently two preferred Power Management System configurations according to this invention, including a series converter configuration, illustrated in FIG. 2, and a parallel converter configuration, shown in FIG. 3. In FIGS. 2 and 3, the hybrid power systems 10, 110 of these two embodiments are shown having only a fuel cell 20 and a battery bank 25. It should be noted, however, that the fuel cell 20 could easily be replaced by any other DC power source, by a rectified AC source, or by an energy storage unit, as desired. Similarly, the battery bank 25 could be replaced by a flywheel energy storage unit or other energy storage device that is charged with and discharges direct current. It should also be noted that any number of fuel cells 20 and DC to DC Converters 14 can be arranged in parallel to supply current to the inverter. And furthermore, the single battery bank 25 could be replaced by any number of parallel battery banks or strings connecting to the common bus.

As noted above, the schematic block diagrams in FIGS. 2 and 3 illustrate a series and a parallel Power Management System 10, 110, respectively, according to preferred embodiments of the present invention. Referring to FIGS. 2 and 3, each of the Power Management Systems 10, 110 includes three main modules: the Controller Module 12; the DC to DC Converter Module (including the current control circuit) 14, 114; and the Inverter Module 16. Any number of independent power sources, such as fuel cell 20 and battery bank 25, are also included.

The independent power sources 20, 25 can operate over different voltage ranges. The Controller Module 12 senses and analyzes the operating output of the power sources 20, 25. The DC to DC Converter Module 14, 114 in conjunction with the Controller Module 12, manages and consolidates the power from these sources 20, 25 into a DC bus 13 for processing by the Inverter Module 16. The system 10, 110 delivers AC electrical power to a load through an output 18 of the Inverter Module 16. The system 10, 110 also automatically controls the charging and discharging of the battery bank 25.

The DC to DC converter 14, 114 operates with its own current control circuit 15. It also communicates with the system controller 12 and receives input signals from the fuel cell controller 22. Therefore, the terms "DC to DC Converter" and "DC to DC Buck and Boost Converter" can be used to refer to not only the actual DC to DC Converter switch related hardware, but also to the current control circuit 15 and the integration of these subsystems with the system controller 12 and the fuel cell (or photovoltaic array, or rectified AC, etc.) controller 22.

In both the series and parallel configurations, each DC bus 13 can operate at its optimum voltage. In the relatively low voltage and high current examples shown in FIGS. 2 and 3, the converter circuits 14, 114 use power MOSFETs to charge and discharge inductors to transfer power to and from the DC power sources. Both the series and parallel power management configurations 10, 110 are preferably configured to operate fully automatically between zero and full power throughput in any of their various operating modes. The transition between these modes can be seamless. Various possible modes include a first mode (e.g., Startup/Shutdown Mode) in which the battery 25 is supplying all of the power to the DC bus 13 and inverter 16; a second mode (e.g., Normal Operation Mode) in which the fuel cell 20 is supplying all of the power to the inverter 16; a third mode (e.g., Recharge Mode) in which the fuel cell 20 is supplying all of the power to the inverter 16 and is also charging the battery 25; and a fourth mode (e.g., Transient Mode) in which the fuel cell 20 is supplying less than the total amount of desired power to the inverter 16 and the battery 25 is supplying the balance of the power.

Figure 1:
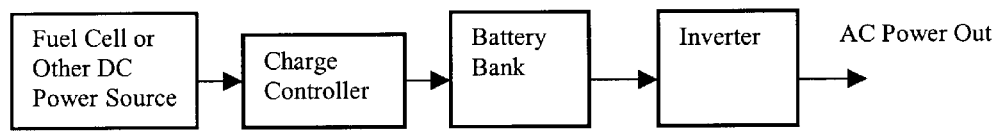
FIG. 1 is a schematic block diagram of a conventional "battery node" hybrid power configuration according to the prior art.

The series configured Power Management System 10, shown in FIG. 2, will now be described in more detail. Referring specifically to FIG. 2, the term "series" refers to the fact that the DC to DC Converter 14 is located in series with the Fuel Cell 20 and the Inverter 16. The series configuration illustrated in FIG. 1 has an input to the inverter that is at the battery output node voltage. Unlike the conventional Hybrid Power configuration, the series Power Manager 10 includes a Controller Module 12 in addition to the DC to DC Converter Module 14 and the Inverter Module 16. The combination of these modules can be referred to as a Power Manager or Power Management System 10.

The Controller Module (or System Controller) 12 manages both the Inverter Module 16 and the Converter Module 14 to provide an integrated control system. The primary functions of the Controller Module 12 are to control the current drawn out of the fuel cell and to operate the Inverter Module 16. The Controller 12 (in combination with the DC to DC Converter 14) controls the voltage of the variable voltage DC bus. The Control Module 12 thereby provides coordinated control of the Power Management System 10. All of the modules, or subsystems, of the Power Management System 10 can be physically integrated together into a single hardware package.

FIG. 3 shows one possible embodiment of a parallel Power Management System configuration 110. Referring to FIG. 3, in this parallel system embodiment 110, the current control circuit 15 detects and controls the DC voltage on the buses for both the battery 25 and the power converter 114. As shown, one of the primary advantages of the parallel system 110 shown is that the voltage output from the fuel cell 20 goes directly into the inverter 16. Because only a relatively small amount of the power is required to travel through the DC to DC converter (i.e., during battery charging or transient conditions), this configuration significantly reduces losses (such as switching losses) and improves efficiency. This configuration also reduces noise and ripple currents.

Figure 4:
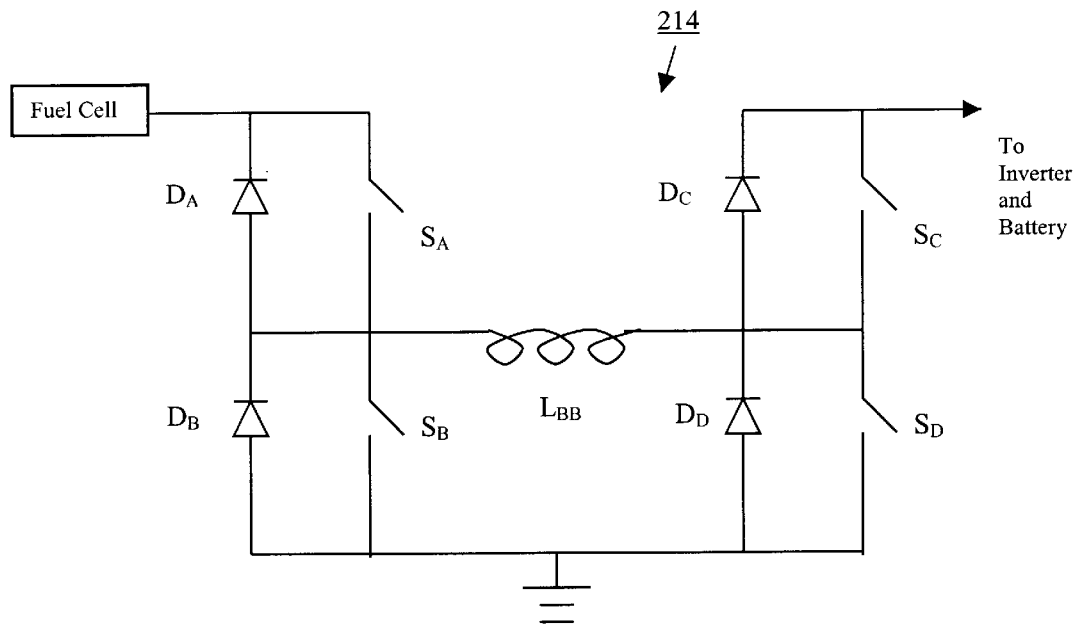
FIG. 4 is a schematic circuit diagram of a Buck and Boost DC to DC Converter according to another aspect of this invention.
Figure 5A:
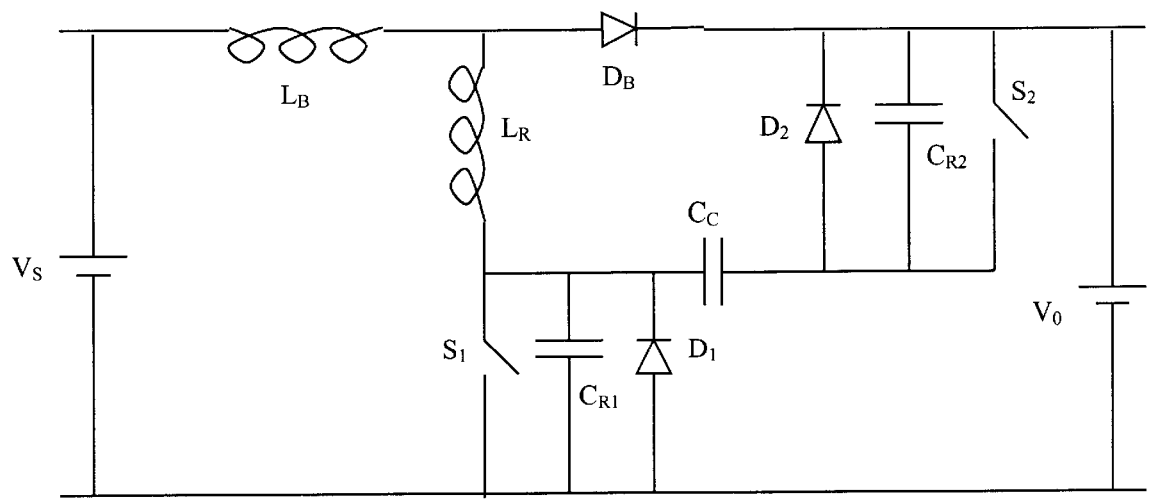
FIG. 5A is a schematic circuit diagram of a Boost DC to DC Converter according to a further aspect of this invention.
Figure 5B:
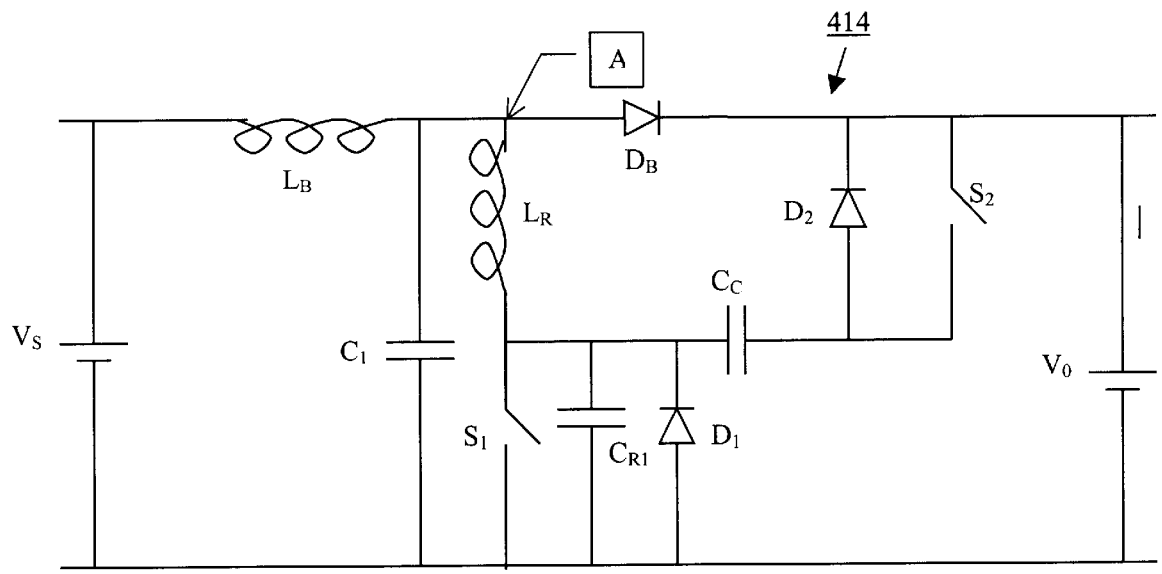
FIG. 5B is a schematic circuit diagram of a Boost DC to DC Converter according to a still further aspect of this invention.

Referring now to FIGS. 4, 5A, and 5B, three DC to DC Converter circuits 114, 214, 314, respectively, have been developed to perform the functions of the invention. Of course, many other circuit arrangements could be developed to perform the same functions and the invention is therefore not limited to any particular circuit arrangement. Circuit A, shown schematically in FIG. 4, provides a fully bi-directional buck and boost (and buck-boost) converter 114. Circuits B and C, illustrated in FIGS. 5A and 5B, respectively, are DC to DC converters 214, 314 with a boost capability only.

Referring to FIG. 4, Circuit A consists of an "H" switch bridge having four switch and diode pairs $S_A$ and $D_A$, $S_B$ and $D_B$, $S_C$ and $D_C$, and $S_D$ and $D_D$, coupled to the buck/boost inductor $L_{BB}$. In this arrangement, the DC to DC converter 114 circuit allows both buck and boost current in both directions. This converter 114 provides a current-controlled type of converter that follows the current demanded from the fuel cell by the inverter (or other load). This circuit provides excellent control of both bucking and boosting voltages with a minimum number of components.

Although FIG. 4 shows the DC to DC Converter 114 installed in series with a fuel cell 20 and inverter 16, such as in the Power Management System configuration shown in FIG. 2, because the converter can transfer power in either direction, the Circuit A converter 114 can also operate in the parallel configuration of FIG. 3. In the parallel Power Management System configuration 110 shown in FIG. 3, bi-directional buck and boost capabilities, such as those provided by this converter 114, are required. In the series configuration 10 illustrated in FIG. 2, however, only a single direction boost capability is required. Of course, many other multi-source power systems are possible which would require the fully bi-directional buck and boost capabilities of the Circuit A converter 114 or a similar converter.

Figure 6:
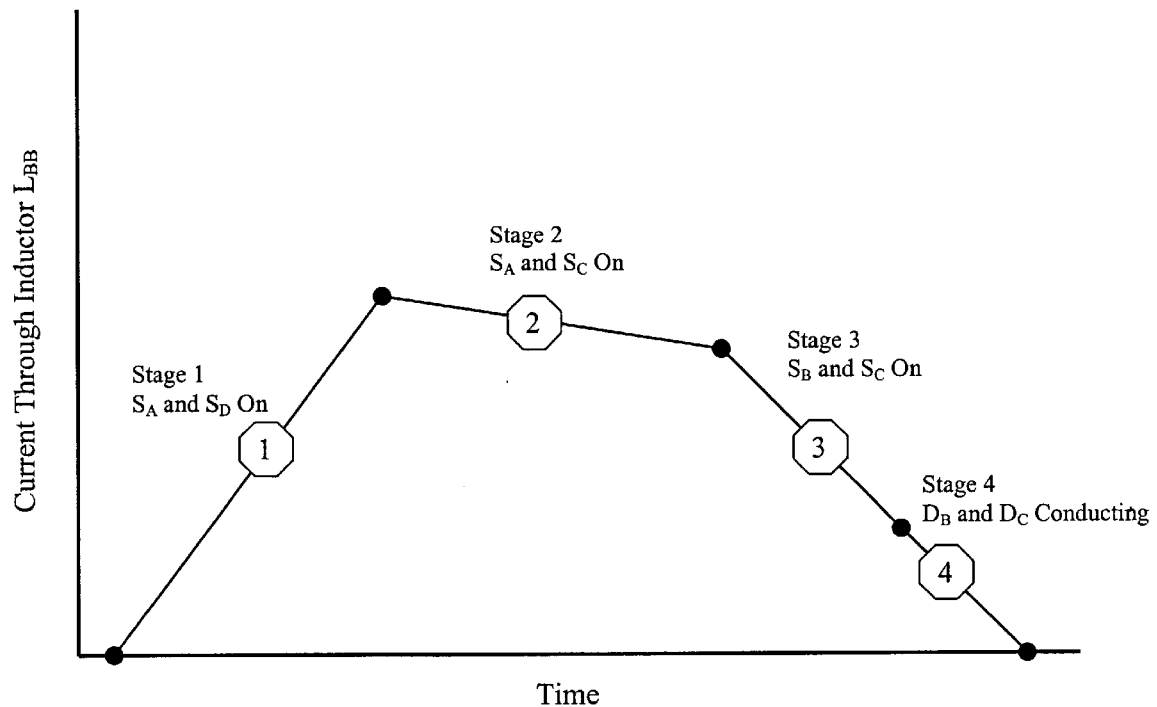
FIG. 6 is a graph illustrating the current flow over time through an inductor of the Buck and Boost DC to DC converter of FIG. 4.

FIG. 6 is a graph illustrating the current flow over time through the inductor $L_{BB}$ of Circuit A of FIG. 4. Referring to FIGS. 4 and 6, Circuit A operates as follows. When switch $S_A$ is closed (on) and switch $S_D$ is closed (on), current flows from the fuel cell 20 through the inductor $L_{BB}$ to ground. The circuit remains in this state until the inductor $L_{BB}$ is charged to a threshold voltage. This state is shown as stage 1 in FIG. 6. A voltage (or current) monitoring circuit (not shown) monitors the voltage across (or current through) the inductor $L_{BB}$.

Once the inductor $L_{BB}$ has been charged to the threshold voltage, switch $S_D$ is opened (off) and switch $S_C$ is closed (on), while switch $S_A$ remains closed (on). This state is shown as stage 2 in FIG. 6. During this stage, current is flowing from the fuel cell 20 to the inverter 16 and battery 25. If the voltage at the output of the converter 114 (i.e., the input to the inverter 16) is raised (or boosted) above the voltage at the input of the converter 114 (i.e., the output terminal of the fuel cell 20), then the circuit is in the boost configuration. In the boost configuration, the slope of the line in FIG. 6 representing stage 2 is downward and is proportional to the voltage delta across the inductor $L_{BB}$ (i.e., the difference between the input and output voltages), and the current through the inductor $L_{BB}$ is being dissipated.

If the voltage at the output of the converter 114 is lower than the voltage at its input, then the circuit is in the buck configuration (i.e., voltage at the inverter input is reduced below the voltage at the fuel cell output). Current and power are still flowing from the fuel cell 20 to the inverter 16 and battery 25, but the slope of the line in FIG. 6 representing stage 2 will be upwards, again in proportion to the voltage delta across the inductor $L_{BB}$. In this state, the current through the inductor continues to ramp up until switch $S_A$ is opened. The converter 114 can be kept in the buck configuration simply by cycling switch $S_A$ to allow the current to maintain a steady level.

In the boost configuration, after the energy in the inductor $L_{BB}$ is substantially dissipated, switch $S_A$ is opened (off) and switches $S_B$ and $S_C$ are closed (on). Closing switches $S_B$ and $S_C$ discharges the remaining energy in the inductor $L_{BB}$ fast without stressing the two diodes $D_B$ and $D_C$. At the same time, however, some current is also flowing through the diodes $D_B$ and $D_C$. When the current through (or voltage across) the inductor $L_{BB}$ drops below a threshold value (i.e., current less than 5A), switches $S_B$ and $S_C$ are opened (off), allowing the diodes $D_B$ and $D_C$ to complete the discharge of the inductor $L_{BB}$. Once the current through the inductor $L_{BB}$ reaches zero, another cycle is started by closing switches $S_A$ and $S_D$.

The inductor $L_{BB}$ should be discharged after reaching the end of stage 2 before beginning a new cycle (stage 1). A current from right to left may still be passing through the inductor $L_{BB}$ at the end of stage 2. In other words, a reverse current may still exist in the inductor $L_{BB}$ at this point. If switches $S_A$ and $S_D$ were simply turned back on and switches $S_C$ and $S_B$ turned off, a large forward current would be generated from the fuel cell through the inductor $L_{BB}$ to ground. These two oppositely directed currents could damage the diodes. Accordingly, the inductor $L_{BB}$ is completely discharged before the next boost cycle is started.

It should also be noted that the converter 114 of Circuit A maintains a high current level during stage 2. This high current level increases the RMS current and eliminates the need for generating a large current peak. The bi-directional aspect of the converter 114 of Circuit A allows the inductor $L_{BB}$ to be discharged faster (i.e., during stages 3 and 4) between boost cycles (stages 1 and 2).

Power flow to the fuel cell 20, although not wanted in practice, is also possible using the bi-directional converter 114 of FIG. 4, and is explained here for illustration. This reverse power flow is potentially desirable for rechargeable DC power sources. Power flow to the fuel cell 20 (from right to left) is enabled in the boost configuration by closing switch $S_C$ and cycling $S_B$. It is enabled in the buck configuration by cycling switch $S_C$. A practical application of where power flow from the inverter/battery would be desirable is where the fuel cell is replaced by a second storage device such as a battery. For example, a battery bank operating at nominally 24 VDC can be used to replace the fuel cell 20. In this circumstance, in the conventional direction (left to right), the DC to DC converter 114 boosts that voltage to nominally 48 VDC, which is the operating voltage of the original battery bank. In the opposite direction (right to left), the DC to DC converter 114 bucks the voltage of the original battery bank to 24 VDC, for instance, to recharge the battery that replaced the fuel cell.

As noted briefly above, a novel method of substantially decreasing the peak to RMS current ratio is also provided. This method is enabled, for instance, by using four parallel gate (or switch) and diode pairs. Again referring to FIGS. 4 and 6, the use of four parallel gate and diode pairs allows the converter 114 of Circuit A to reduce the current peak and tailor the shape of the current flowing through the inductor $L_{BB}$ during each cycle. This is accomplished by operating pairs of switches for the first three stages of the cycle. During stage 1, the switches $S_A$ and $S_D$ are on. During stage 2, the switches $S_A$ and $S_C$ are on. And, during stage 3, switches $S_B$ and $S_C$ are on. During the fourth and final stage (stage 4), current is conducted through diodes $D_B$ and $D_C$ only. Alternatively, the cycle can be constructed of three stages rather than four, with the first two stages being the same as the first two stages described previously and with the third stage being that of conducting current through diodes $D_B$ and $D_C$ only. In other words, the third stage of the four stage process could be eliminated, if desired, to create a three stage process.

Figure 5C:
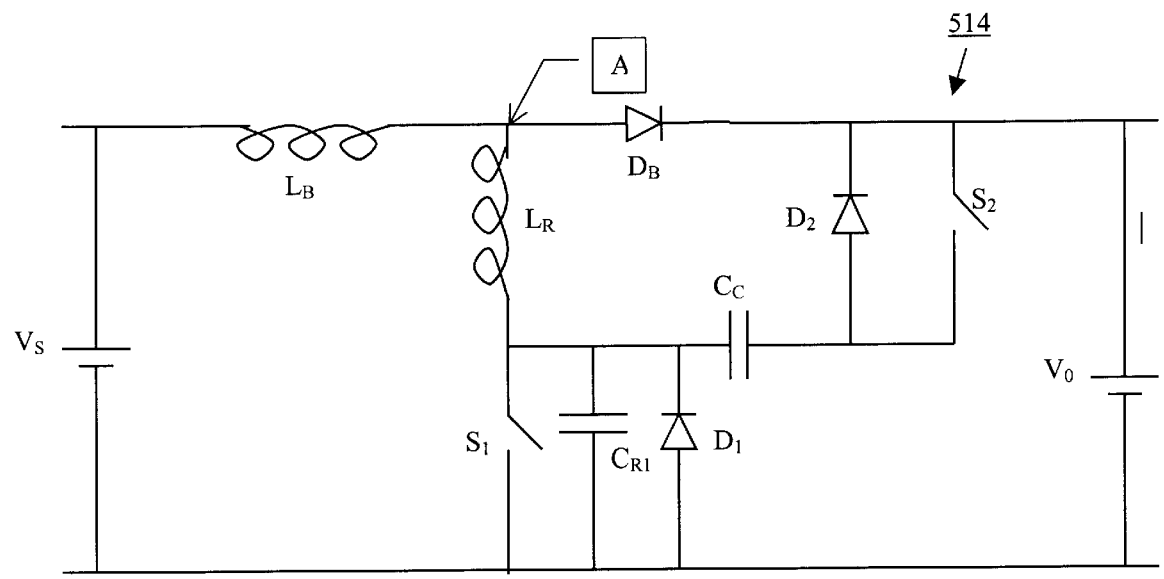
FIG. 5C is a schematic circuit diagram of a Boost DC to DC Converter according to the prior art.

"Boost only" DC to DC Converter circuits 214, 314 are shown in FIGS. 5A and 5B, respectively. These converter circuits represent a significant improvement to the conventional converter circuit design described in the technical paper: Duarte, Claudio Manoel da Cunha and Ivo Barbi, "A New Family of ZVS-PSW Active-Clamping DC-to-DC Boost Converters: Analysis, Design, and Experimentation" *IEEE Transactions on Power Electronics*, Vol. 12, No. 5, September 1997, pp 824–831 (the "Duarte paper") (see FIG. 5C).

Circuit B, shown in FIG. 5A, and Circuit C, shown in FIG. 5B, are designed to be zero-voltage switching (ZVS) pulse-width modulation (PWM) active-clamping DC to DC boost converters. The circuits are based on the "boost-buck-boost" circuit shown in FIG. 1(c) of the Duarte paper. The general circuit configuration shown in FIG. 1(c) of the Duarte paper is reproduced here as FIG. 5C. In each of the circuits shown in FIGS. 5A, 5B, and 5C, power is transferred to the load during a boost stage, while the clamping action is performed during a buck-boost stage. The converter circuits of FIGS. 5A, 5B, and 5C differ from earlier conventional boost pulse-width modulation (PWM) converters because of the incorporation of an additional auxiliary switch ($S_2$), a resonant inductor ($L_R$), a resonant capacitor ($C_{R1}$) (which includes the output capacitance of the power switches), and a clamping capacitor $C_C$. In each of these circuits, switch $S_1$ is the main switch. Voltage $V_S$ is the input voltage and voltage $V_O$ is the output voltage. Inductor $L_R$ and capacitor $C_{R1}$ are the resonant circuit inductor and capacitor, respectively. Inductor $L_B$ is the boost inductor.

Despite the similarities between these converter circuits, the converters 214, 314 of Circuits B and C, respectively, each offer an improved design over that of the prior art circuit 414. More specifically, an additional capacitor is included in each of Circuits B and C to achieving soft switching and reliable current control for low voltage (e.g., less than about 100V) and high current (e.g., up to around 150A) applications. The circuits developed and described by Duarte and Barbi are primarily aimed at high voltage (i.e., around 300V~400V), low current (i.e., around 5A) applications, and because of the low current involved, do not contemplate the need for additional capacitors for satisfactory switching. By recognizing and addressing this need, the two converters 214, 314 of FIGS. 5A and 5B are able to offer improved performance over prior art DC to DC converter circuits, such as the one 414 illustrated in FIG. 5C, in low voltage/high current applications.

Referring to FIG. 5A, the DC to DC converter 214 of Circuit B includes the addition of a capacitor $C_{R2}$ on the output side of the resonant circuit across the auxilliary switch $S_2$. The second resonant capacitor $C_{R2}$ is beneficial in low voltage and high current applications such as fuel cell and battery systems because it substantially reduces output DC current ripple and switching losses and provides better control for combined low voltage/high current applications.

The principle of operation of Circuit B is as follows. The inductance in the boost inductor $L_B$ is assumed to be large enough for the inductor to act as a current source ($I_S$). The clamping capacitor $C_C$ is selected to have a large capacitance so that the voltage $V_C$ across this capacitor can be considered a constant. The main and auxiliary switches $S_1$ and $S_2$, respectively, are switched in a complementary way. The main switch $S_1$ is turned off at time (t)=$t_o$, when the switching period starts.

Before time $t_o$, the main switch $S_1$ is on and the auxiliary switch $S_2$ is off. When $S_1$ is turned off at time $t_o$, the resonant capacitor $C_{R1}$ is linearly charged, by the boost inductor current $I_S$, to a base voltage $V_0$. Due to the presence of the resonant capacitor $C_{R1}$, the main switch $S_1$ is turned off with no switching loss. When the voltage $V_{CR1}$ reaches the voltage $V_0$, the boost diode $D_B$ begins conducting. The current through the resonant inductor $L_R$ and the resonant capacitor $C_{R1}$ then evolves in a resonant way, and the resonant capacitor voltage $V_{CR1}$ rises from the base voltage $V_0$ up to a increased voltage equal to $V_{Cc}+V_0$. At that point, the voltages are clamped. As the capacitor voltage $V_{CR1}$ becomes equal to $V_{Cc}+V_0$, the voltage across the auxiliary switch $S_2$ is zero, and the switch $S_2$ turns on with a no loss zero-voltage switching (ZVS). The resonant inductor $L_R$ current then ramps down until it reaches zero, when it changes its direction and rises again.

This stage ends when the auxiliary switch $S_2$ is turned off with zero volts on the switch $S_2$ due to the presence of the added capacitor $C_{R2}$ at time $t_3$ (t=$t_3$). The voltage across the resonant capacitor $C_{R1}$ falls, due to resonance between inductor $L_R$ and the first or second resonant capacitor $C_{R1}$ or $C_{R2}$, until it reaches zero at time $t_4$ (t=$t_4$). In stage 5, the main switch $S_1$ is turned on without any switching losses (ZVS), because the first resonant capacitor voltage $V_{CR1}$ became null. During this stage, the current through the resonant inductor $L_R$ changes its polarity and ramps up to reach the boost inductor current $I_S$. At time $t_5$ (t=$t_5$), the diode $D_B$ becomes reversibly biased and power is not transferred to the load. This stage ends when the main switch $S_1$ is turned off at the end of the first switching cycle to start the next switching cycle.

Circuit B offers an improvement over the prior art by splitting its resonant circuit capacitance between two capacitors $C_{R1}$ and $C_{R2}$ to allow zero or low voltage switching by both switches $S_1$ and $S_2$. More particularly, the second resonant capacitor $C_{R2}$ acts as part of the resonant control circuit that includes the resonant inductor $L_R$ and the first resonant capacitor $C_{R1}$. The oscillation that occurs when the main switch $S_1$ is switched on and off can be neutralized using the second capacitor $C_{R2}$ by selectively switching the auxiliary switch $S_2$. When the second capacitor $C_{R2}$ is substantially smaller than the first capacitor $C_{R1}$, oscillation control can be provided at low voltage. By dividing the capacitance between the two resonant circuit capacitors $C_{R1}$ and $C_{R2}$, the voltage on switches $S_1$ and $S_2$ can be ramped down to allow zero voltage switching. Furthermore, because the capacitors store the voltages with no voltage losses, they provide efficient power transfer between the input and the output nodes of the converter 214.

Referring now to FIG. 5B, the DC to DC converter 314 of Circuit C is another boost converter embodiment capable of use in the Power Management System 10 of FIG. 2. In this converter 314, an input capacitor $C_1$ has been added to the input side of the resonant circuit of the prior art converter 414 of FIG. 5C. Without the capacitor $C_1$, the voltage at node A dips in high current applications, and large voltage swings occur at that node. These voltage swings cause a large voltage stress on switch $S_1$ and result in an inability to achieve reliable control of the current through the resonant inductor $L_R$.

With the addition of capacitor $C_1$ in the circuit, the voltage at node A can be held steady during switching. Because the input capacitor $C_1$ maintains a constant voltage at node A, the voltage stress on the main switch $S_1$ is reduced. Specifically, by dampening the voltage swings at node A, the input capacitor $C_1$ filters out high voltage swings and keeps them from affecting the switch $S_1$. This steady voltage at node A helps achieve soft switching and good current control.

Having described and illustrated the principles of the invention in various preferred embodiments thereof, it should be apparent that the various implementations of the invention described above can be modified in arrangement and detail without departing from such principles. We claim all modifications and variations coming within the spirit and scope of the following claims.

What is claimed is:

1. A power management system, comprising:
    a plurality of independent DC power sources connected to a DC bus, wherein at least one of the independent power sources comprises a rechargeable DC power source for supplying power to and receiving power from the DC bus, and wherein at least one of the DC power sources is a fuel cell;
    a DC to DC converter connected between an output of the rechargeable DC power source and the DC bus in parallel with the fuel cell; and
    a system controller for managing power transfer between the multiple independent DC power sources and the DC bus.

2. A power management system according to claim 1, wherein the system controller is configured to control the current supplied from each of the power sources to the DC bus and from the DC bus to each of the power sources.

3. A power management system according to claim 1, further comprising an inverter for converting DC power from the independent DC power sources into AC power.

4. A power management system according to claim 1, wherein the fuel cell comprises a fuel cell controller.

5. A power management system according to claim 4, wherein the system controller communicates with the fuel cell controller to control the amount of power supplied by the fuel cell to the DC bus.

6. A power management system according to claim 1, wherein the DC to DC converter further comprises a converter control circuit that communicates with the system controller to control an amount of power transferred between the DC to DC converter and the DC bus.

7. A power management system according to claim 1, further comprising an inverter, wherein the DC to DC converter is arranged in series between the rechargeable DC power source and the inverter.

8. A power management system according to claim 1, further comprising an inverter, wherein the DC to DC converter is arranged in parallel with the fuel cell and the inverter.

9. A method for managing multiple independent DC power sources, comprising:
    arranging a plurality of independent DC power sources in communication with a DC bus, wherein at least one of the DC power sources comprises a fuel cell;
    converting a voltage from one or more of the independent DC power sources to conform to a voltage of the DC bus, wherein converting a voltage from one or more of the independent DC power sources to conform to a voltage of the DC bus comprises arranging a DC to DC converter in series between one or more of the independent DC power sources and the DC bus and in parallel with the fuel cell and the DC bus; and controlling the amount of power that the DC bus supplies to or receives from one or more of the independent power sources.

10. A method of managing multiple independent DC power sources according to claim 9, wherein controlling the amount of power that the DC bus supplies to or receives from one or more of the independent power sources comprises integrating between a plurality of modes wherein each of the DC power sources is either supplying some or all of the required power, being recharged by one or more of the other DC power sources, or being isolated from the DC bus.

11. A method of managing multiple independent DC power sources according to claim 9, wherein converting a voltage from one or more of the independent DC power sources to conform to a voltage of the DC bus comprises arranging a DC to DC converter in series between a rechargeable DC power source and the DC bus.

12. A method of managing multiple independent DC power sources according to claim 11, wherein the DC to DC converter is arranged in parallel with the fuel cell and an inverter.

13. A method of managing multiple independent DC power sources according to claim 9, further comprising supplying the DC power from the DC bus to an inverter for conversion into AC power to enable the provision of AC power to a load.

* * * * *

UNITED STATES PATENT AND TRADEMARK OFFICE
CERTIFICATE OF CORRECTION

PATENT NO. : 6,628,011 B2
DATED : September 30, 2003
INVENTOR(S) : Droppo et al.

It is certified that error appears in the above-identified patent and that said Letters Patent is hereby corrected as shown below:

<u>Title page,</u>
Item [56], References Cited, U.S. PATENT DOCUMENTS, should include:

| | | |
|---|---|---|
| -- 3,793,578 | 2/1974 | Rettig |
| 5,847,941 | 12/1998 | Taguchi et al. |
| 5,859,772 | 1/1999 | Hilpert |
| 6,072,710 | 6/2000 | Chang--. |

<u>Column 5,</u>
Line 49, "nominally 24 VDC can" should read -- nominally 24VDC can --.
Line 52, "nominally 48 VDC, which" should read -- nominally 48VDC, which --.
Line 55, "to 24 VDC, for" should read -- to 24VDC, for --.

Signed and Sealed this

Eighth Day of June, 2004

JON W. DUDAS
*Acting Director of the United States Patent and Trademark Office*